(12) United States Patent
Carter

(10) Patent No.: US 9,764,266 B1
(45) Date of Patent: Sep. 19, 2017

(54) MODULAR AIR FILTER HOUSING

(71) Applicant: Scott Carter, Rogers, AR (US)

(72) Inventor: Scott Carter, Rogers, AR (US)

( * ) Notice: Subject to any disclaimer, the term of this patent is extended or adjusted under 35 U.S.C. 154(b) by 0 days.

(21) Appl. No.: 15/095,770

(22) Filed: Apr. 11, 2016

Related U.S. Application Data

(63) Continuation-in-part of application No. 14/637,042, filed on Mar. 3, 2015, now abandoned, and a continuation-in-part of application No. 29/448,658, filed on Mar. 13, 2013, now Pat. No. Des. 742,496, and a continuation-in-part of application No. 29/471,889, filed on Nov. 6, 2013, now Pat. No. Des. 727,487.

(51) Int. Cl.
*B01D 46/00* (2006.01)
*B01D 46/12* (2006.01)

(52) U.S. Cl.
CPC ....... *B01D 46/0005* (2013.01); *B01D 46/002* (2013.01); *B01D 46/125* (2013.01)

(58) Field of Classification Search
None
See application file for complete search history.

(56) References Cited

U.S. PATENT DOCUMENTS

| | | | | |
|---|---|---|---|---|
| 2,044,221 A * | 6/1936 | Myers | ........... | B01D 46/125 55/483 |
| 2,966,959 A * | 1/1961 | Neumann | ........... | B01D 46/125 55/484 |
| 3,177,637 A * | 4/1965 | Davis | ........... | B01D 46/0013 210/485 |
| D204,839 S | 5/1966 | Bishop | ........... | 62/4 |
| 4,157,251 A * | 6/1979 | Colomer | ........... | B01D 46/002 55/431 |
| 4,685,944 A * | 8/1987 | Allan | ........... | B01D 46/0004 55/491 |
| 4,969,936 A * | 11/1990 | Schweigert | ........... | B01D 46/125 96/129 |
| 5,080,699 A * | 1/1992 | Ho | ........... | B01D 53/0415 55/385.1 |
| 5,223,011 A * | 6/1993 | Hanni | ........... | B01D 46/125 55/484 |
| 5,512,074 A * | 4/1996 | Hanni | ........... | B01D 46/0005 55/484 |
| 5,593,476 A * | 1/1997 | Coppom | ........... | B03C 3/155 95/78 |
| 5,733,350 A * | 3/1998 | Muller | ........... | B01D 53/0407 55/482 |
| 5,759,239 A * | 6/1998 | Yu | ........... | B03C 3/155 422/121 |
| 6,214,076 B1 * | 4/2001 | Beier | ........... | B01D 46/0005 55/484 |
| D455,826 S | 4/2002 | Gillingham et al. | ........... | 23/365 |

(Continued)

*Primary Examiner* — Amber R Orlando
*Assistant Examiner* — Britanny Precht
(74) *Attorney, Agent, or Firm* — Keisling & Pieper PLC; David B. Pieper

(57) ABSTRACT

An air filter module for modularly mounting angled air filters. The module includes a top plate, bottom plate, left and right front corners with the corners defining perpendicular side walls, angled filter end retention walls, angled side walls, and a back wall with angled side walls, parallel end retention walls, and a positioning guide. The positioning guide is constructed from clips or a guide face and an inner side positioning wall.

16 Claims, 13 Drawing Sheets

(56) References Cited

U.S. PATENT DOCUMENTS

| | | | | |
|---|---|---|---|---|
| D469,863 S | | 2/2003 | Kice | 23/386 |
| 6,835,128 B1* | | 12/2004 | Olson | F24F 3/044 |
| | | | | 454/158 |
| 7,156,898 B2* | | 1/2007 | Jaisinghani | B03C 3/09 |
| | | | | 264/257 |
| D584,807 S | | 1/2009 | Sundvik et al. | 23/365 |
| 7,585,346 B2* | | 9/2009 | Roseberry | B01D 46/30 |
| | | | | 55/484 |
| 7,588,629 B2* | | 9/2009 | Osborne | B01D 24/00 |
| | | | | 55/482 |
| 7,931,726 B2* | | 4/2011 | Karlsson | B01D 46/0001 |
| | | | | 264/DIG. 48 |
| 8,303,678 B2* | | 11/2012 | Steele | B01D 46/003 |
| | | | | 55/430 |
| 8,603,229 B2* | | 12/2013 | Tatarchuk | B01D 46/002 |
| | | | | 55/482 |
| 8,747,506 B2* | | 6/2014 | Borkent | B01D 46/0023 |
| | | | | 55/495 |
| 2004/0144254 A1* | | 7/2004 | Wiser, III | B01D 46/0005 |
| | | | | 96/66 |
| 2004/0163370 A1* | | 8/2004 | Haufe | B01D 46/0005 |
| | | | | 55/483 |
| 2007/0199289 A1* | | 8/2007 | Bland | B01D 46/10 |
| | | | | 55/493 |
| 2007/0199449 A1* | | 8/2007 | Wiser | B01D 46/0032 |
| | | | | 96/69 |
| 2011/0236448 A1* | | 9/2011 | Cundell | F24F 3/16 |
| | | | | 424/402 |
| 2011/0252759 A1* | | 10/2011 | Nicholas | B01D 46/0005 |
| | | | | 55/497 |
| 2011/0277430 A1* | | 11/2011 | Nicholas | B01D 46/0005 |
| | | | | 55/483 |

\* cited by examiner

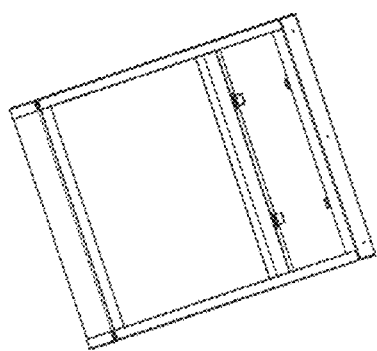
FIG. 16
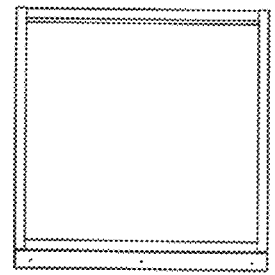
FIG. 19
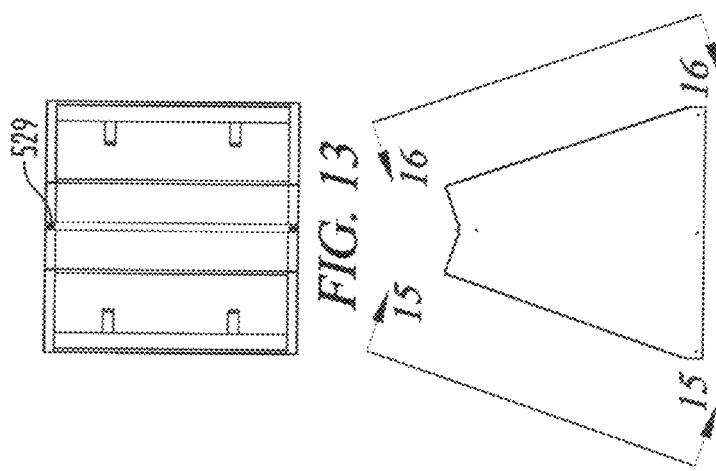
FIG. 13
FIG. 14
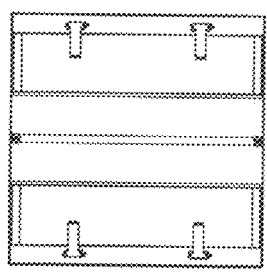
FIG. 18
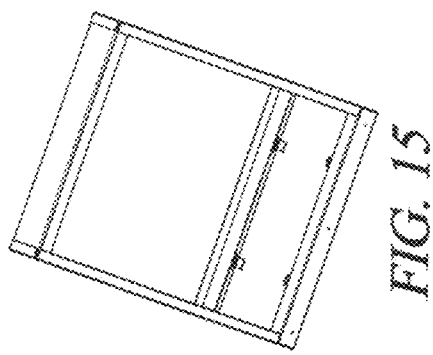
FIG. 15
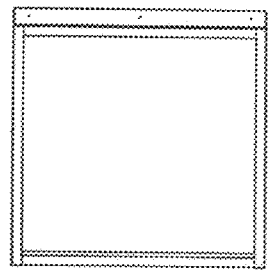
FIG. 17

MODULAR AIR FILTER HOUSING

CROSS-REFERENCE TO RELATED APPLICATIONS

This application claims priority to and is a continuation-in-part of U.S. patent application Ser. No. 14/637,042, filed on Mar. 13, 2015 entitled MODULAR AIR FILTER HOUSING, which is a continuation-in-part of U.S. patent application Ser. No. 29/448,658, filed on Mar. 13, 2013 entitled AIR FILTER HOUSING and U.S. patent application Ser. No. 29/471,889, filed on Nov. 6, 2013 entitled ANGLED BIFILTER HOUSING which are hereby incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in air filter housings. More particularly, the invention relates to improvements particularly suited for providing increased air filtration with lower pressure drops for enhanced air filtration with easily replaceable filters. In particular, the present invention relates specifically to an angled filtration module.

2. Description of the Known Art

As will be appreciated by those skilled in the art, air filters and housings are known in various forms. The universal individual air filter holding frame has been around for almost half a century and is still by far the most popular face loaded type filter frame on the market. While different filters may be used in the housing, these types of frames require use of separate clips of different types according to the style of filter used. These clips have to be installed initially and then unclipped and reattached to either lances in the frame or the filter itself each time the filter is changed for proper seating against the back gasket. This is time consuming and troublesome due to the awkward nature of the clips and the quantities involved, typically four clips per frame. These frames are also directly joined together in banks and therefore have very little space between filters and clips which adds to the difficulty. Because they are mounted in a wall arrangement perpendicular to the airflow, the velocity has been limited to typically 500 fpm or less which is the most common upper limit for testing air filters. Any higher velocity would jeopardize the efficiency and structural integrity of the filter if it was not manufactured and tested accordingly. Higher velocities also typically decrease the efficiency of any filter. Velocities beyond this threshold cause an increase in pressure drop, sometime dramatically, creating a requirement for an increase in fan motor horsepower and energy use. As a result, units selected requiring these gasketed face loaded filter frames have overall size and capacity limitations due to many times just the filter velocity only. The other required components in the system could many times be selected for higher velocities such as the coils, heaters, etc. if the filters wire within design parameters.

Patents disclosing information relevant to air filters include:

U.S. Pat. No. 8,747,506, issued to Borkent, et al. on Jun. 10, 2014 entitled Atmospheric air filtration unit, air prefiltration unit, and associated air filtration system for removable attachment thereof; U.S. Pat. No. 8,603,229, issued to Tatarchuk, et al. on Dec. 10, 2013 entitled Multielement structured arrays (MESA's) for cost effective and high efficiency treatment of fluids; U.S. Pat. No. 7,585,346, issued to Roseberry, et al. on Sep. 8, 2009 entitled Media holding module; U.S. Pat. No. 7,156,898, issued to Jaisinghani on Jan. 2, 2007 entitled Low pressure drop deep electrically enhanced filter; U.S. Pat. No. 6,835,128, issued to Olson on Dec. 28, 2004 entitled Ceiling mounted air filtering and distribution apparatus operated independently of any HVAC system; U.S. Pat. No. D469,863, issued to Kice on Feb. 4, 2003 entitled Drop front aspirator, U.S. Pat. No. 1,455,826, issued to Gillingham, et al. on Apr. 16, 2002 entitled Filter Apparatus; U.S. Pat. No. 5,733,350, issued to Muller, et al. on Mar. 31, 1998 entitled Container for solid filtration media and filtration system utilizing same; U.S. Pat. No. 5,593,476, issued to Coppom on Jan. 14, 1997 entitled Method and apparatus for use in electronically enhanced air filtration; U.S. Pat. No. 5,223,011, issued to Hanni on Jun. 29, 1993 entitled Air filter assembly; U.S. Pat. No. 4,969,936, issued to Schweigert, et al. on Nov. 13, 1990 entitled Filtration apparatus; U.S. Pat. No. 4,685,944, issued to Allan, et al. on Aug. 11, 1987 entitled High efficiency particulate air filter; and U.S. Pat. No. 2,966,959, issued to Max Neumann Gerhard, on Jan. 3, 1961 entitled V shaped filter cell housing and means of sealing filter frames therein. Each of these patents is hereby expressly incorporated by reference in each of their entirety.

From these prior references it may be seen that these prior art patents are very limited in their teaching and utilization, and an improved modular air filter is needed to overcome these limitations.

SUMMARY OF THE INVENTION

The present invention is directed to an improved modular air filter system using modular components in a v shaped frame as a retrofit capability for inefficient systems and new applications. In accordance with one exemplary embodiment of the present invention, a double cartridge air filter module is provided using a top plate mounted to three vertical pieces including a left front corner, right front corner, and back wall which are all then connected to a bottom plate. The filters are removably and sealably engaged inside the air filter module with clips, sealing strips, and all of the seams or any remaining voids are sealed with sealing caulk or possibly continuous welds.

The performance of the double cartridge frame opens up many design opportunities that currently are not available with the commonly supplied filter holding frames and housings. High velocity frames with an efficient gasket seal have not been available in the industry. With the evolving technology of new higher efficiency filter medias, there has been a push by most all HVAC filter manufacturers to produce low pressure drop high efficiency filters, especially in the common 4" depth in lieu of the standard 12" to save labor, freight, manufacturing materials and disposal cost. The filter frames take full advantage of this technology to a level not conceived by the industry.

The following are just a few of the applications that are real possibilities using the double cartridge frames:

The immediate offering of a sealed or gasket filtration system for high velocity applications.

The option of higher efficiency filters in standard units, not currently offered, without dramatically effecting blower redesign and increased motor horsepower.

The use of high efficiency prefilters in air conditioning applications allowing the units to remain clean requiring less maintenance and chemicals commonly used, such as acids and alkalines, while running more efficiently and reducing energy.

Greatly extended change-out frequency for all applications, especially limited accessible locations, due to the low velocity across each filter.

The potential application of two 4" deep true HEPA filters in lieu of the standard 12" deep filters commonly used now.

The potential design of high velocity air conditioning units which could decrease the overall cabinet height and/or width of an entire unit for limited space applications.

Energy retrofits of existing applications that have high design velocities and/or high efficiency filters with higher pressure drops.

The overall benefits of this product have the potential to impact many segments throughout the air filter industry. The markets affected would include and not be limited to the manufacturers of air conditioning and heating units; process equipment OEM's of all kinds including for food and bottling equipment, air compressors, coolers, engine and motor intakes, gas turbines; outside air installations using fans, make-up air units, and intake hoods; foremarket and aftermarket filter housings; etc. The availability of a product that would be beneficial in just one area would be considerable with such a large market potential. However, a product that would significantly reduce waste storage, transfer and landfill requirements; energy; cleaning chemicals; shipping cost; and labor is unprecedented.

Thus, the need arises to retrofit into existing units for older applications located in fixed rooms or positions where length and width cannot be increased. Furthermore, these systems may in hospital or critical operation systems where the need concentrates on the ability to have minimum downtime, easily checked filters, and easily replaced filters. The present invention addresses these situations.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 13 shows a back view of the housing of FIG. 11.

FIG. 14 shows a top view of the housing of FIG. 11, the bottom view being a mirror image thereof.

FIG. 15 shows an angled left view of the housing of FIG. 11.

FIG. 16 shows an angled right view of the housing of FIG. 11.

FIG. 17 shows a perpendicular left view of the housing of FIG. 11.

FIG. 18 shows a front view of the housing of FIG. 11.

FIG. 19 shows a perpendicular right view of the housing of FIG. 11.

DETAILED DESCRIPTION OF THE INVENTION

Figure 8:
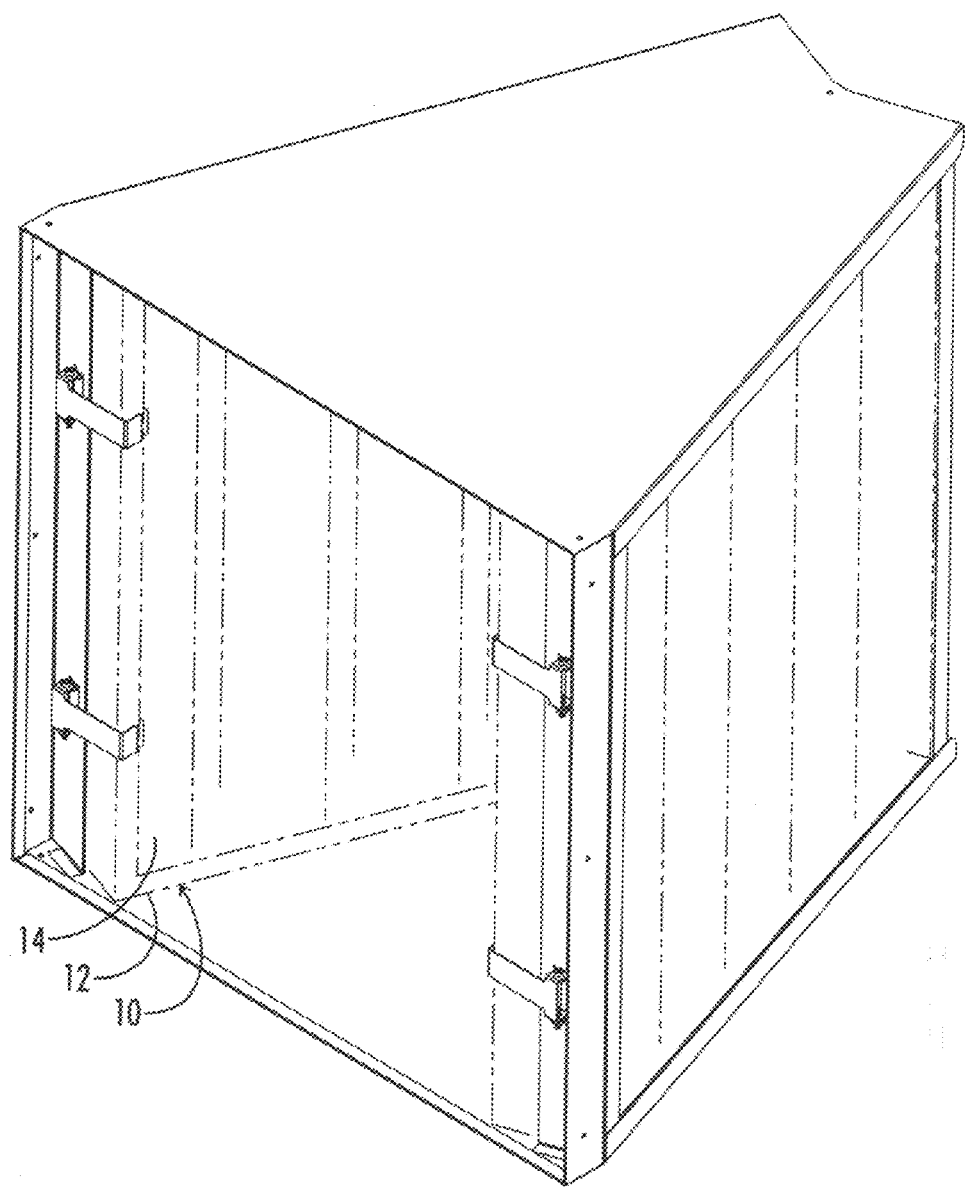
FIG. 8 shows a filter installation with the filters shown in broken lines.
Figure 9:
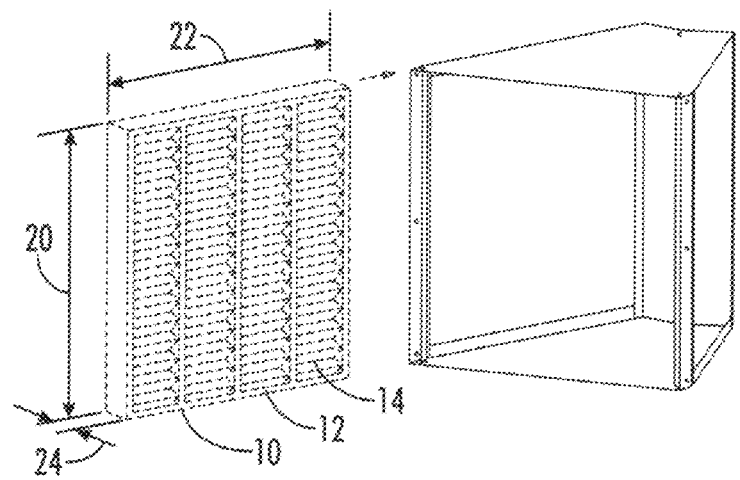
FIG. 9 shows a filter removed from a single module before filter installation.
Figure 10:
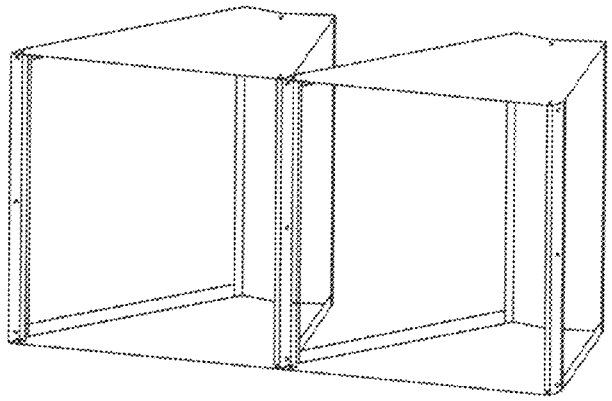
FIG. 10 shows a riveted horizontal stack.
Figure 11:
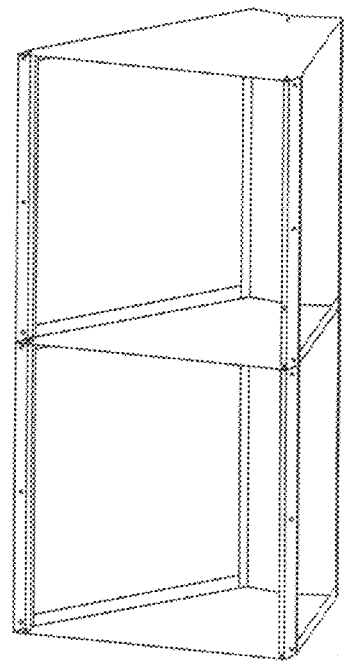
FIG. 11 shows a riveted vertical stack.
Figure 12:
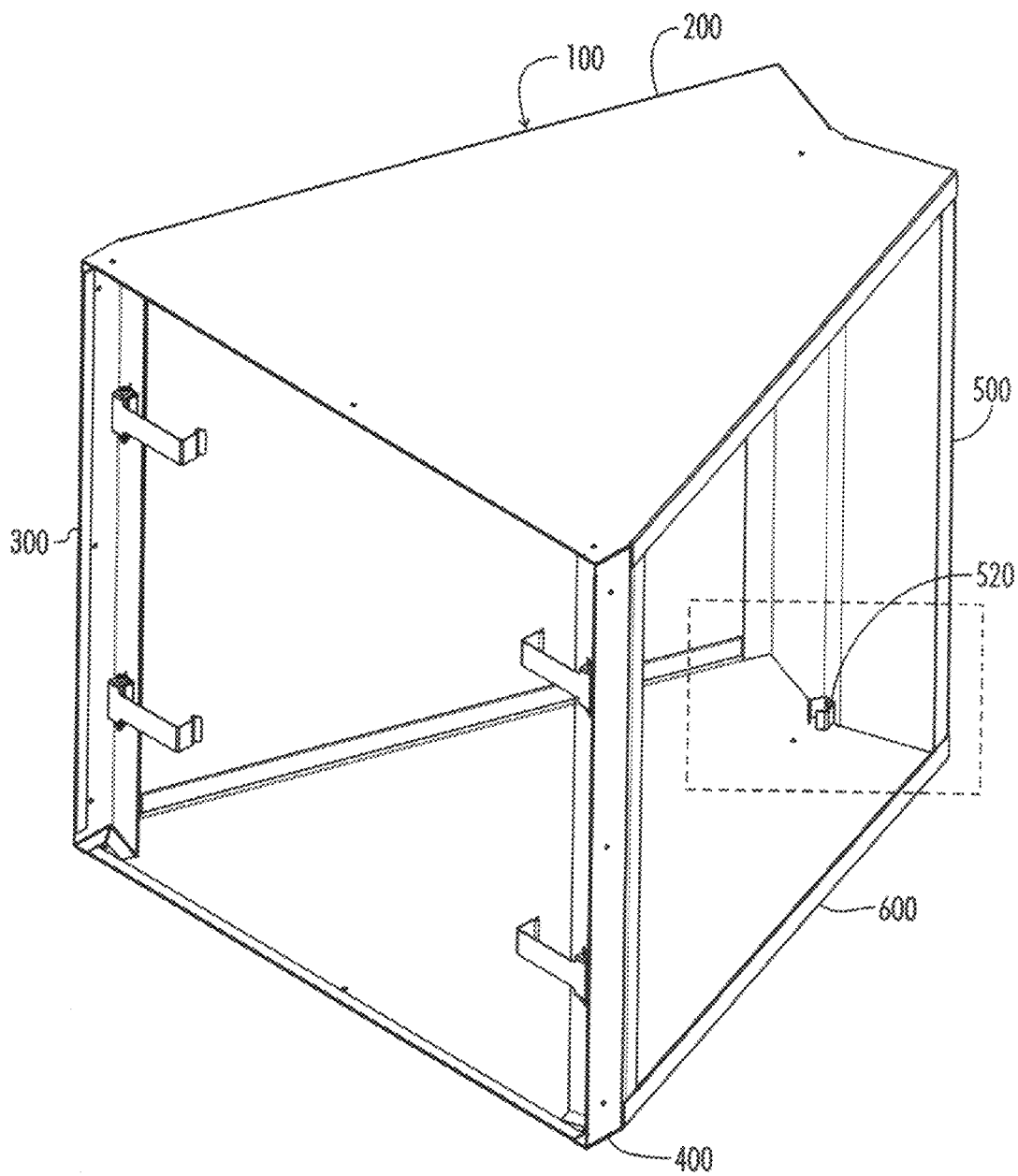
FIG. 12 shows an upper right front perspective view of an angled bifilter housing with an outer housing frame with a solid top and bottom, open sides, retention clips mounted on front guide walls and a positioning spring clip on the back wall.

As shown in FIGS. 1 through 20 of the drawings, one exemplary embodiment of the present invention is generally shown as an air filter module 100. FIG. 8 shows how the air filter module 100 shown is designed for housing a double set of matching air filters 10. FIG. 9 shows how each air filter 10 includes a filter frame 12 housing a filter media 14. The filter frame 12 has a height 20, width 22, and depth 24. The filter media 14 is typically a pleated fabric or mesh with different available characteristics as is known in the art. FIGS. 1 through 7 show a first embodiment, and FIGS. 12 through 20 show a second embodiment with the embodiments sharing some similar characteristics.

Returning to FIGS. 1 through 20, the air filter module 100 is made from a top plate 200 mounted to three vertical pieces including a left front corner 300, right front corner 400, and back wall 500 which are all then connected to the bottom plate 600. The filters 10 are sealing engaged inside the air filter module with clips 335 and face sealing strips 700, and all of the seams or any remaining voids are sealed with sealing caulk 800.

The top plate 200 includes a top plate body 210 defining top stack connection apertures 212 and a top outer surface 214 and a top inner surface 216. The top plate 200 includes a top front reinforcing edge 220, a top left drop wall 230, a top right drop wall 240, and a top back drop wall 250. The top front reinforcing edge 220 includes a top front left edge 222, a top front middle hem 224, and a top front right edge 226. For this invention, a edge is simply an exposed cut end of the metal plate. A hem is where the edge is folded back onto the surface which provides a smooth bend surface to the user with the end cut of the metal away bent back away from the fold. The top front reinforcing edge 220 is made this way to weld the respective vertical corners 400, 500 on the corresponding left edge 222 and right edge 226 of the top without having the hem 224 interfere. The top left drop wall 230 includes a top left back edge 232, a top left tab 234 formed with a top left hem 236, and a top left front edge 238. The top right drop wall 240 includes a top right back edge 242, a top right tab 244 formed with a top right hem 246, and a top right front edge 248. The top back drop wall 250 includes a first top back tab 252 with a first top back edge 253, a middle back edge 254, and a second top back tab 256 with a second top back edge 257.

Figure 1:
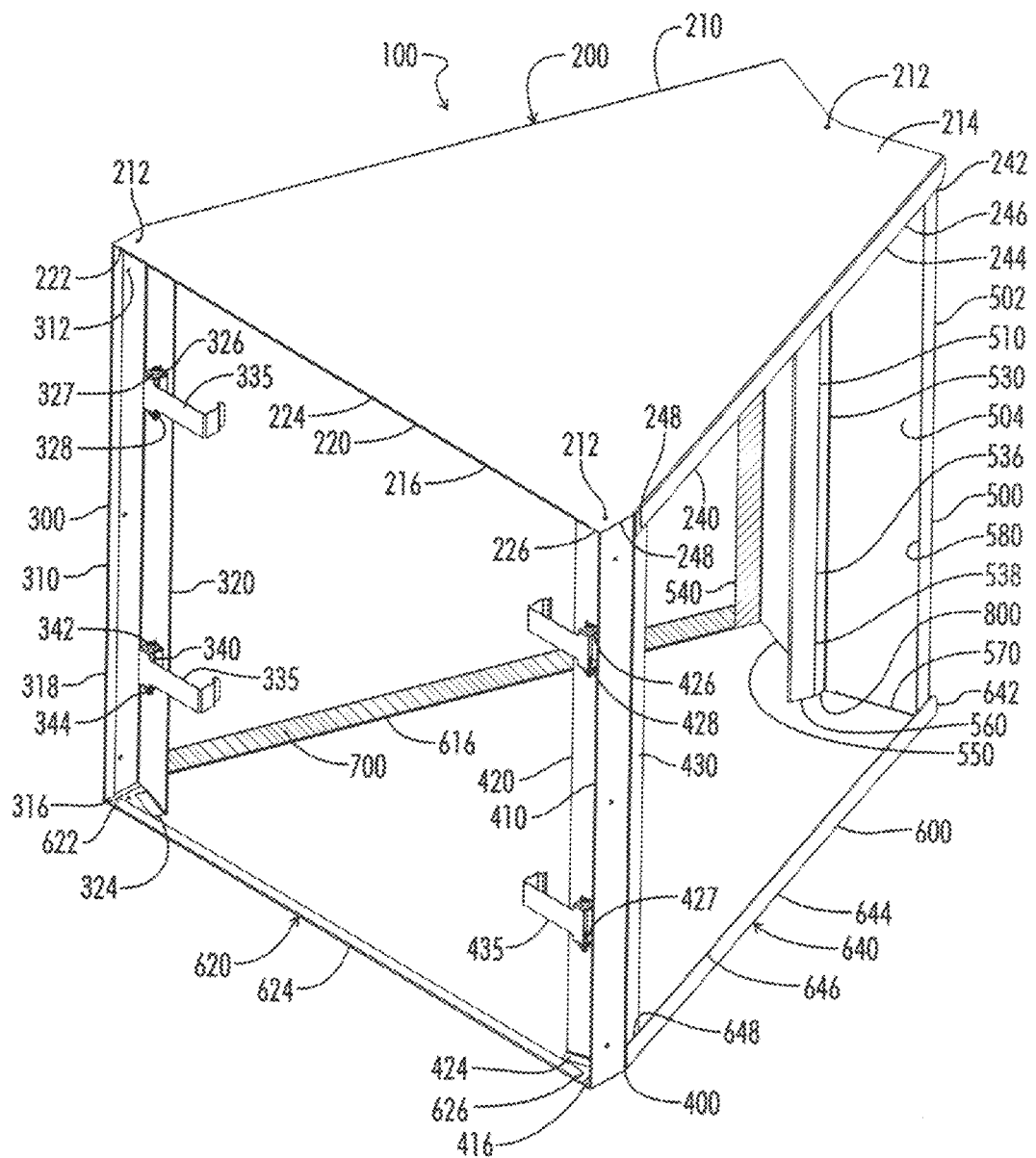
FIG. 1 is an upper right from perspective view of an angled bifilter housing with an outer housing frame with a solid top and bottom, open sides, retention clips mounted on front guide walls and a closed back stop with central guiding angle.
Figure 1A:
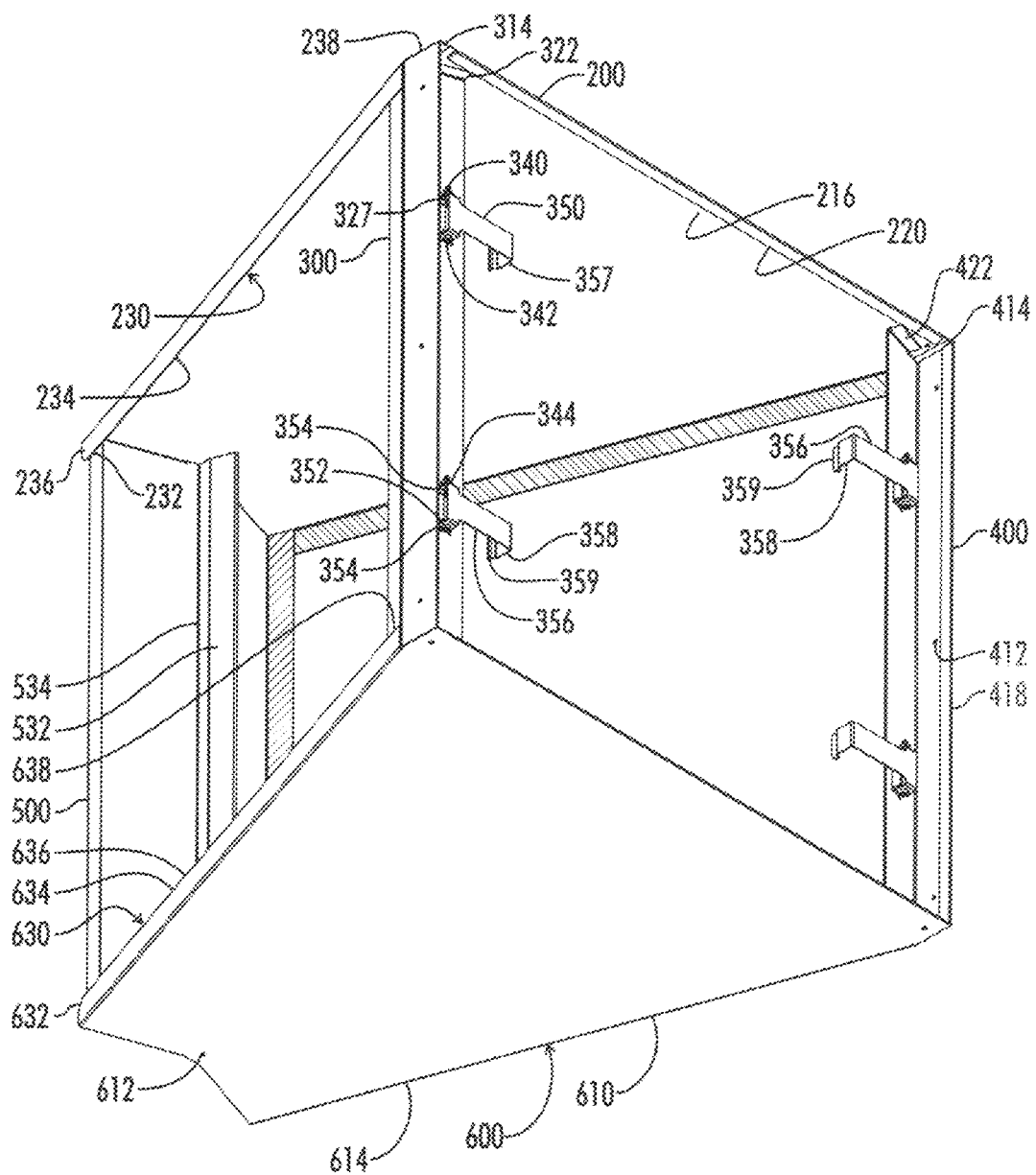
FIG. 1a is the angled bifilter housing shown from a lower left front view.
Figure 2:
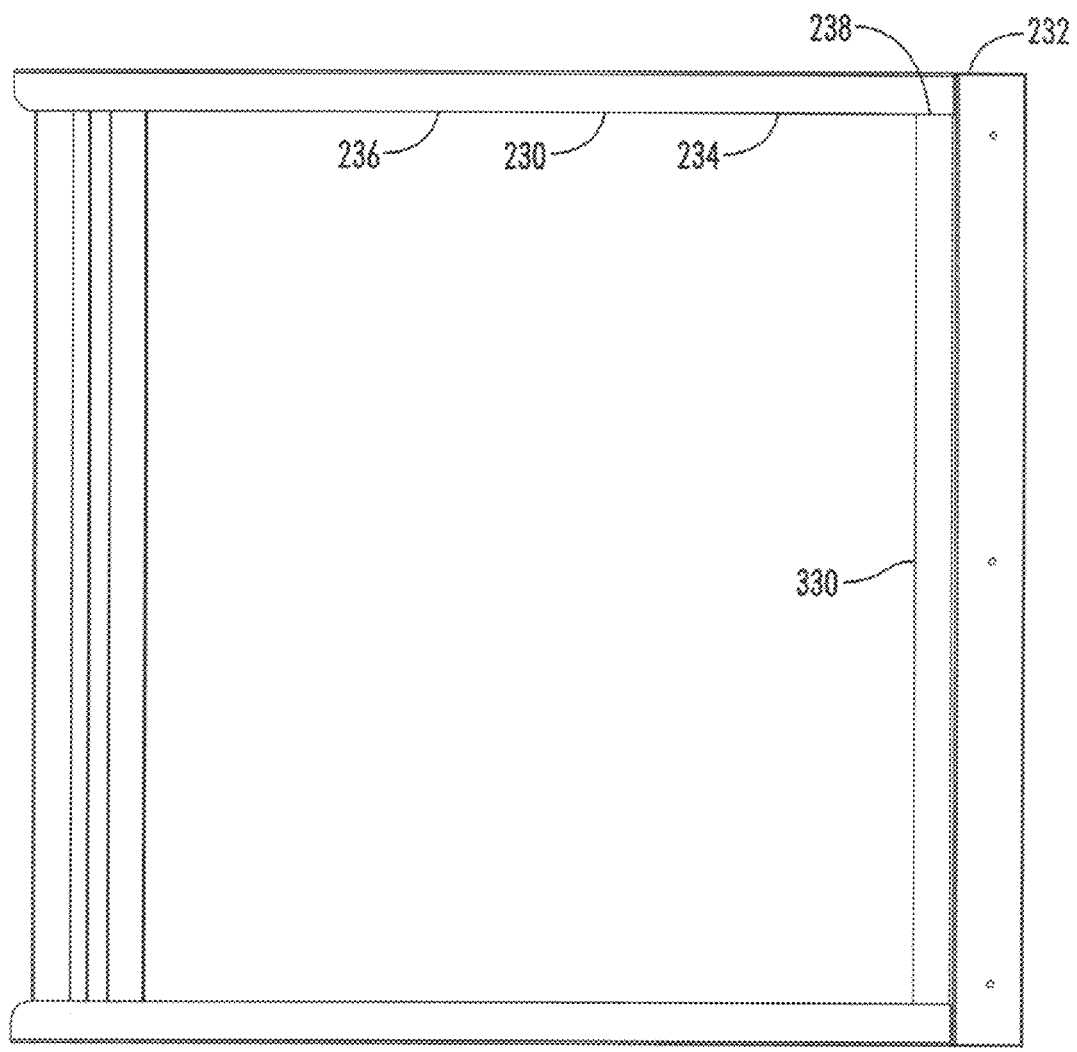
FIG. 2 is a left side view thereof.
Figure 3:
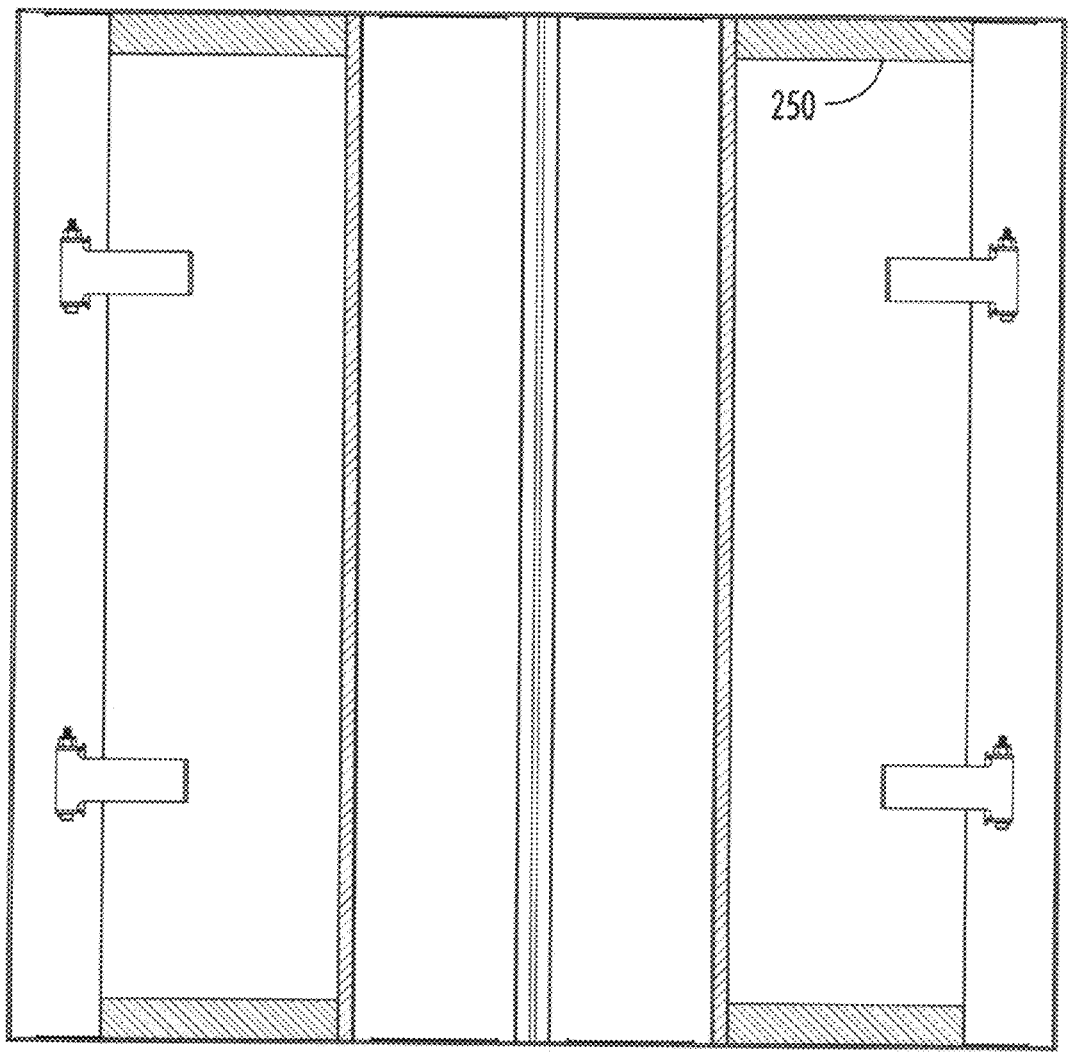
FIG. 3 is a front view thereof.
Figure 4:
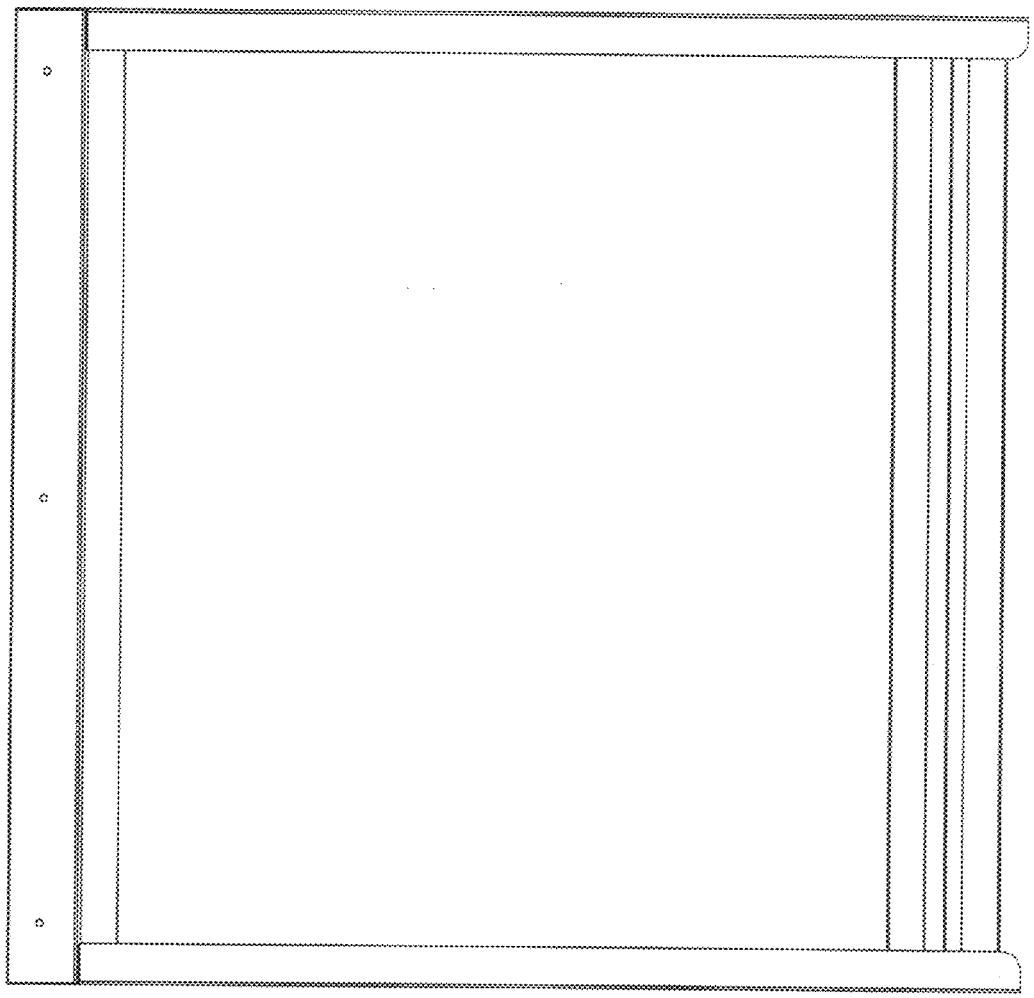
FIG. 4 is a right side view thereof.
Figure 5:
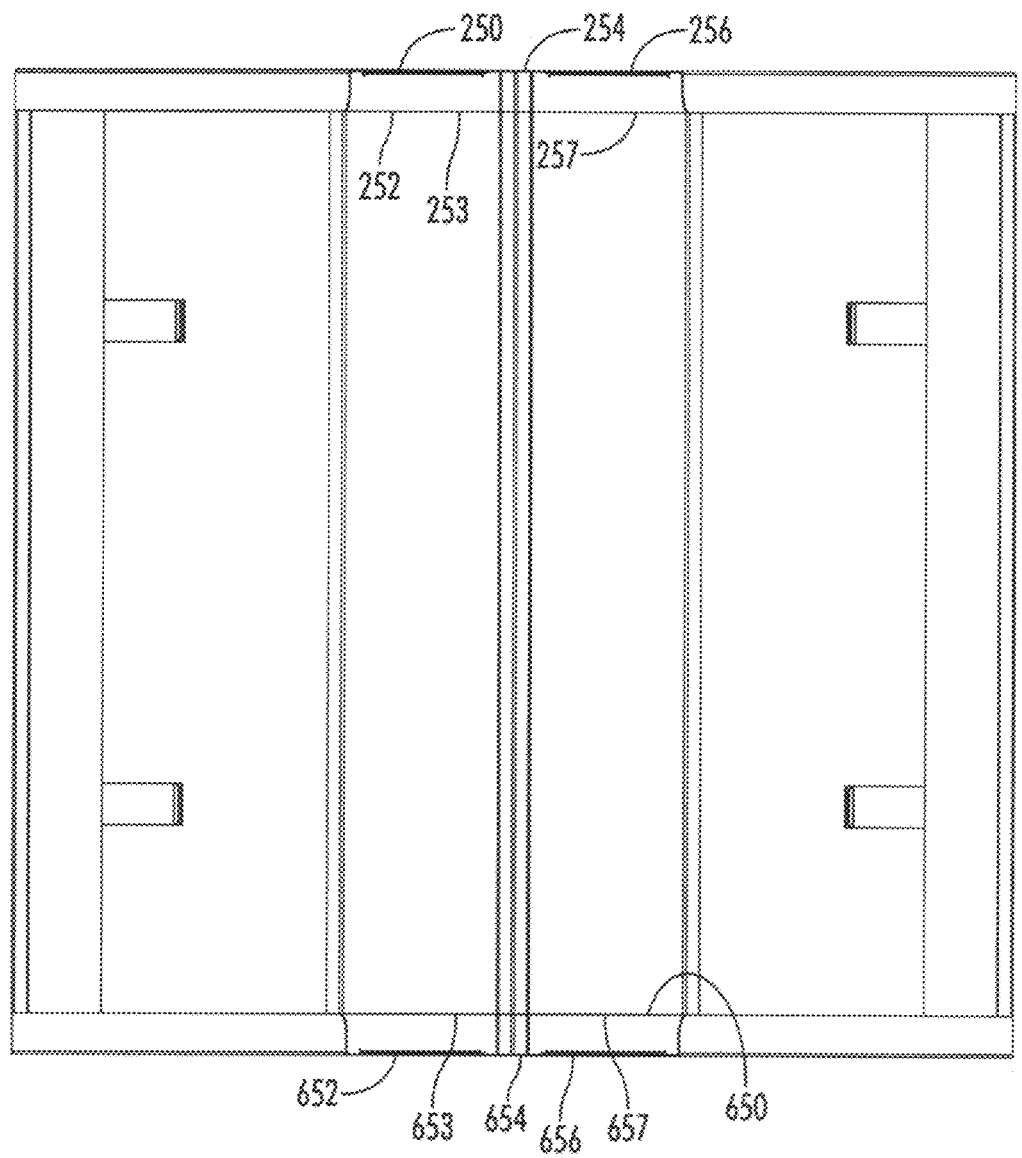
FIG. 5 is a back view thereof.
Figure 6:
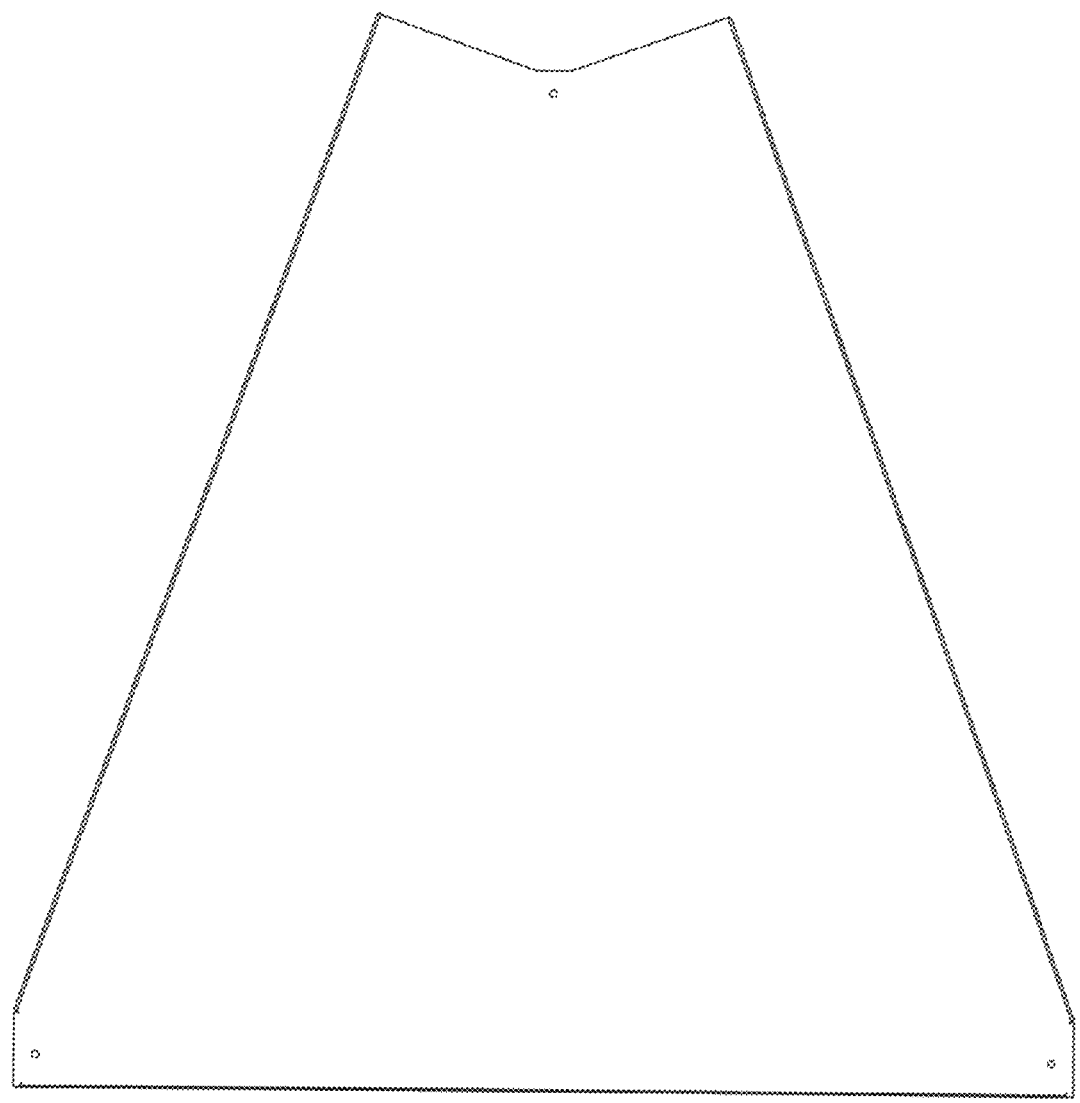
FIG. 6 is a top view thereof.
Figure 7:
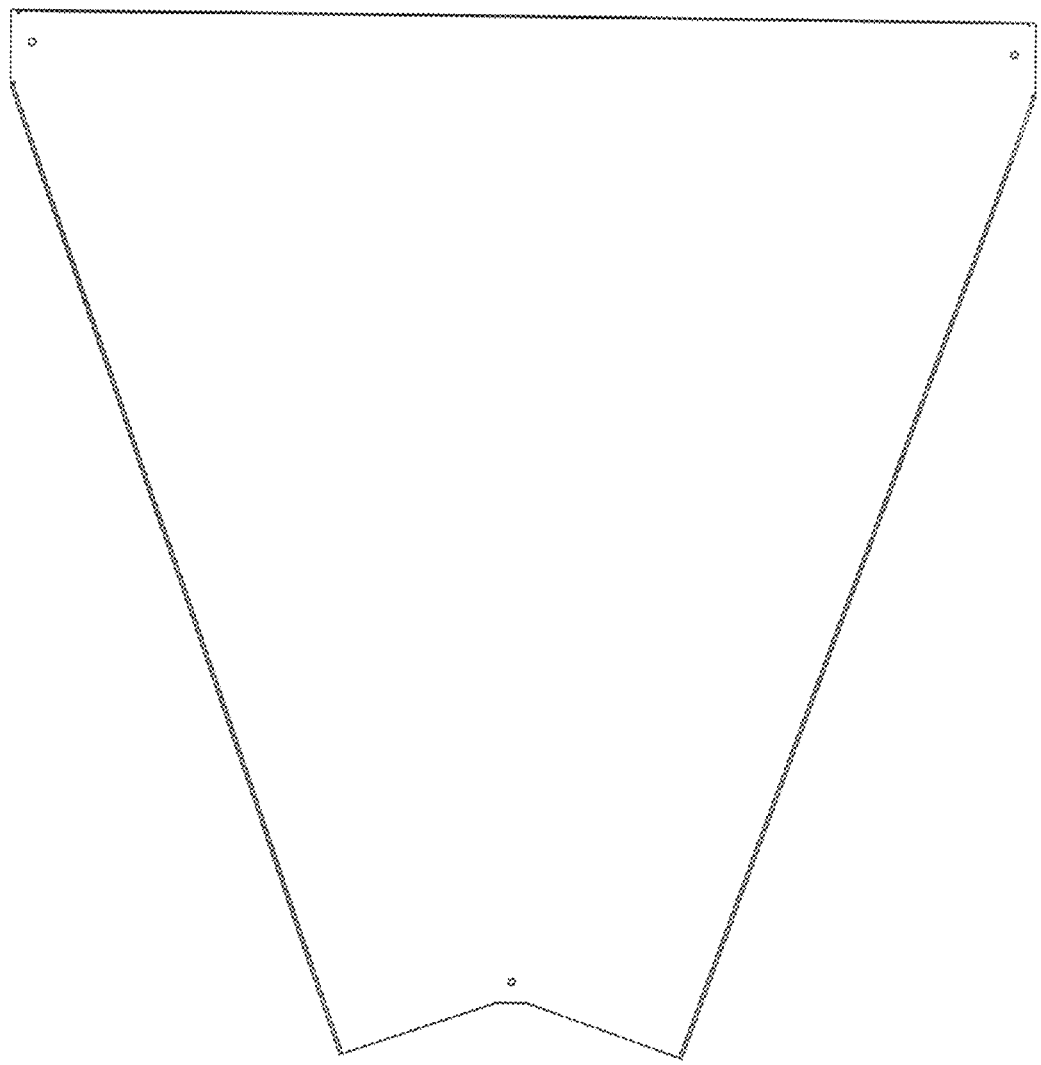
FIG. 7 is a bottom view thereof.

The left front corner 300 includes a left module perpendicular side wall 310, a left filter end retention wall 320, and a left filter edge angled side retention wall 330 (see FIG. 2). The left module perpendicular side wall 310 is constructed with side stack connection apertures 312 for horizontally connecting to other modules 100. The left module perpendicular side wall 310 further includes a left side top tab 314 for connection to the top plate 200, a left side bottom tab 316 for connection to the bottom plate 600, and a left front hem 318 for providing a smooth edge during filter 10 replacement. The Left filter end retention wall 320 includes a left top retention tab 322 for connection to the top plate 200 and a left bottom retention tab 324 for connection to the bottom plate 600. The Left filter end retention wall 320 further includes upper clip tabs 326 and lower clip tabs 328 with both defining axle apertures 327 for mounting clips 335.

Each clip 335 includes a clip axle 340 mounted through the axle apertures 327. In the preferred embodiment, the clip axle 340 is constructed from an axle bolt 342 and axle nut 344. The clip arm 350 is pivotally mounted off of the clip axle 340 using base tabs 352 defining pivot apertures 354. The clip arm includes an extending flex arm 356 that terminates in a catch hand 357. The catch hand 357 includes a retention finger 358 with a release tab 359.

The right front corner 400 includes a right module perpendicular side wall 410, a right filter end retention wall 420, and a right filter edge angled side retention wall 430. The right module perpendicular side wall 410 is constructed with side stack connection apertures 412 for horizontally connecting to other modules 100. The right module perpendicular side wall 410 further includes a right side top tab 414 for connection to the top plate 200, a right side bottom tab 416 for connection to the bottom plate 600, and a right front hem 418 for providing a smooth edge during filter 10 replacement. The right filter end retention wall 420 includes a right top retention tab 422 for connection to the top plate 200 and a right bottom retention tab 424 for connection to the bottom plate 600. The right filter end retention wall 420 further includes upper clip tabs 426 and lower clip tabs 428 with both defining axle apertures 427 for mounting clips 435 which are simply the left side clips 335 rotated one hundred and eighty degrees.

The back wall 500 is constructed with a back left filter end retention filter edge retention side wall 540, a back left filter edge retention parallel filter end angled wall 550, a back middle wall 560, a back right filter edge retention parallel filter end angled wall 570, and a back right filter end retention filter edge retention side wall 580. This forms a back outer surface 502 and a back inner surface 504. The back inner surface is used to mount the back filter positioning guide 510.

The back filter positioning guide 510 includes either a positioning spring 520 or a positioning guide wall 530. The positioning spring 520 is chosen when manufacturing tolerances on the filter 10 are loose and the dimensions vary from filter 10 to filter 10. When the dimensional consistency of the filters 10 are consistent, the positioning guide wall 530 is optional.

Figure 20:
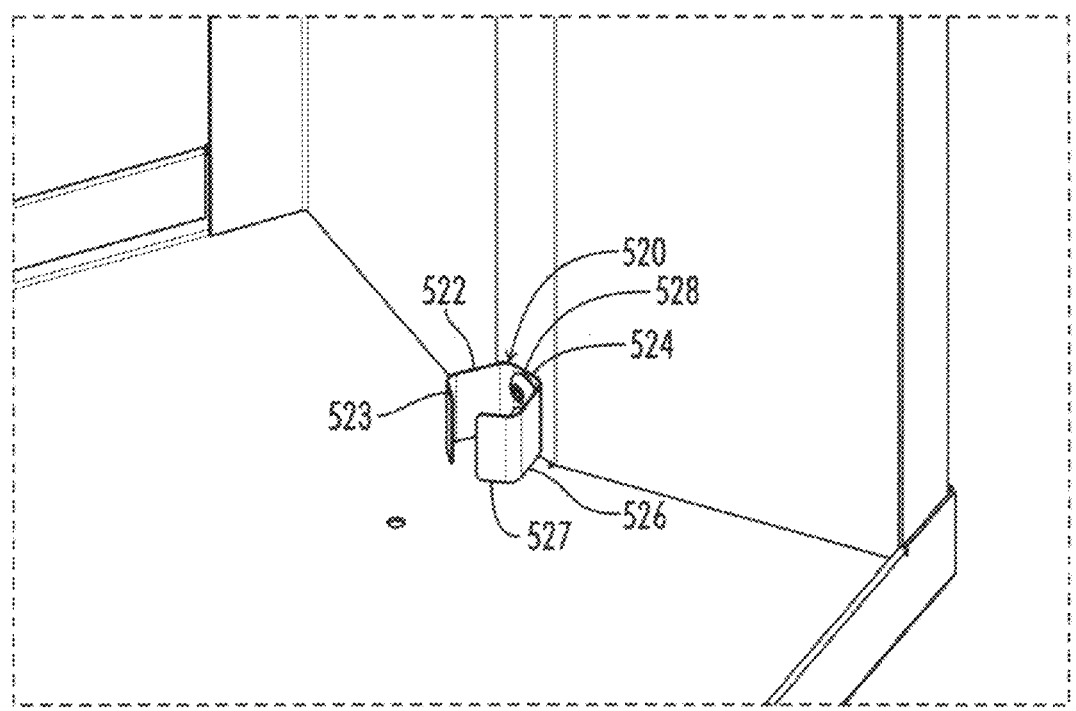
FIG. 20 shows a magnified view of the back spring clip.

FIG. 20 shows the positioning spring 520 made with a left spring arm 522 for retaining the filter 10 with the left spring arm 522 ending in a left spring guide finger 523 that guides the filter 10 into position during installation of the filter 10. The left spring arm 522 is connected to the mounting base 524. Similarly, the right spring arm 526 is also connected to the mounting base 524 and the right spring arm 526 includes a right spring guide finger 527. The mounting base 524 mounted to the back middle wall 560 with a one or more spring bolt(s) 528 and spring nut(s) 529 where the nut 529 may be welded on such that only a front accessed screwdriver is need to change out the positioning spring 520. In this manner, different filter sizes may be adapted for with a front only access point allowing for a simple change out of the positioning spring 520.

The positioning guide wall 530 embodiment is made with a left guide face 532, a left positioning wall 534, a right guide face 536, and a right positioning wall 538. In this embodiment, the filter 10 is positioned between one of the positioning walls 534, 538, the same side end retention filter edge retention side wall 540, 580 and the sealing strips 700 are used to absorb the variations in the filter 10 thickness dimension. Tension adjustments can be made by slightly vending one or both positioning walls 534, 538.

The bottom plate 600 includes a bottom plate body 610 defining bottom stack connection apertures 612 and a bottom outer surface 614 and a bottom inner surface 616. The bottom plate 600 includes a bottom front reinforcing edge 620, a bottom left rise wall 630, a bottom right rise wall 640, and a bottom back wall 650. The bottom front reinforcing edge 620 includes a bottom front left edge 622, a bottom front middle hem 624, and a bottom front right edge 626. For this invention, a edge is simply an exposed cut end of the metal plate. A hem is where the edge is folded back onto the surface which provides a smooth bend surface to the user with the end cut of the metal away from the fold. The bottom left rise wall 630 includes a bottom left back edge 632, a bottom left tab 634 formed with a bottom left hem 636, and a bottom left front edge 638. The bottom right wall 640 includes a bottom right back edge 642, a bottom right tab 644 formed with a bottom right hem 646, and a bottom right from edge 648. The bottom back rise wall 650 includes a first bottom back tab 652 with a first bottom back hem 653, a middle back edge 654, and a second bottom back tab 656 with a second bottom back hem 657.

Note that all seams can be sealed with a caulk or gasket material, but are preferably welded The present invention's double cartridge filter frame allows the mounting of two standard size filters in the same face opening size as one filter used in the standard universal holding frame. There are two significant overall improvements to the existing design. The first is a dramatically easier filter installation and removal and the second is the broad impact of the overall performance. The installation and removal of the filters is greatly simplified by the use of back spring clips or an angled guide wall combined with front hinged swing clamps that are semi-permanently installed when manufactured. The filter, while in the vertical position, is slid along the bottom of the frame towards the back and to one side of both the upper and lower clips and then gently shoved and pushed to the outside of the frame against the gasket. In the alternative back angle guide wall embodiment, the filter is slide to one side of the back wall. The one or two front clamps are swung over and gently pushed, snapping the filter into position firmly against the gasket. To remove the filter, the clamps are gripped, flexed, and then popped off the filter, swinging back out of the way. The filter is pulled slightly inward away from the back front vertical supports and straight out. There are no separate clips to handle and change out time is significantly reduced. The flexing of the spring clip flex arm allow for variations in tolerance from manufacturer to manufacturer as well as different materials used for filter frame construction. The spring clips are easily adjustable in place to increase or decrease tension. Both spring clips and front hinged clips are easily replaceable in the field if ever required. By just changing the swing clamps and back spring clips, different width filters can be used. For instance, the standard frame is currently made for nominal 4" deep filters. Different clamps and spring clips would allow for the use of nominal 2" deep filters or other sizes as well.

Reference numerals used throughout the detailed description and the drawings correspond to the following elements:

Air filter 10
Filter frame 12
Filter media 14
Air filter module 100
Top plate 200
Top plate body 210
Top stack connection apertures 212
Top outer surface 214
Top inner surface 216
Top front reinforcing edge 220
Top front left edge 222
Top front middle hem 224
Top front right edge 226
Top left drop wall 230
Top left back edge 232
Top left tab 234
Top left hem 236
Top left front edge 238
Top right drop wall 240
Top right back edge 242
Top right tab 244
Top right hem 246
Top right front edge 248
Top back drop wall 250
First top back tab 252
First top back edge 253
Middle back edge 254
Second top back tab 256
Second top back edge 257
Left front corner 300
Left module perpendicular side wall 310
Side stack connection apertures 312
Left side top tab 314
Left side bottom tab 316
Left front hem 318
Left filter end retention wall 320
Left top retention tab 322
Left bottom retention tab 324
Upper clip tabs 326
Axle aperture 327
Lower clip tabs 328
Left angled side retention wall 330
Clip 335
Clip axle 340
Axle bolt 342
Axle nut 344
Clip arm 350
Base tabs 352
Pivot aperture 354
Extending flex arm 356
Catch hand 357
Retention finger 358
Release tab 359
Right front corner 400
Right module perpendicular side wall 410
Side stack connection apertures 412
Right side top tab 414
Right side bottom tab 416
Right front hem 418
Right filter end retention wall 420
Right top retention tab 422
Right bottom retention tab 424
Upper clip tabs 426
Axle aperture 427
Lower clip tabs 428
Right filter edge angled side retention wall 430
Back wall 500
Back outer surface 502
Back inner surface 504
Back Filter positioning guide 510
Positioning spring 520
Left spring arm 522
Left spring guide finger 523
Mounting base 524
Right spring arm 526
Right spring guide finger 527
Spring bolt 528
Spring nut 529
Positioning guide wall 530
Left guide face 532
Left positioning wall 534
Right guide face 536
Right positioning wall 538
Back left filter edge retention filter edge retention side wall 540
Back left parallel filter end angled wall 550
Back Middle wall 560
Back right parallel filter end angled wall 570
Back right filter edge retention side wall 580
Bottom plate 600
Bottom plate body 610
Bottom stack connection apertures 612
Bottom outer surface 614
Bottom inner surface 616
Bottom front reinforcing edge 620
Bottom front left edge 622
Bottom front middle hem 624
Bottom front right edge 626
Bottom left rise wall 630
Bottom left back edge 632
Bottom left tab 634
Bottom left hem 636
Bottom left front edge 638
Bottom right rise wall 640
Bottom right back edge 642
Bottom right tab 644
Bottom right hem 646
Bottom right front edge 648
Bottom back rise wall 650
First bottom back tab 652
First bottom back hem 653

Middle back edge 654
Second bottom back tab 656
Second bottom back hem 657
Sealing strips 700
Sealing caulk 800

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An air filter module apparatus for holding an air filter with a front end, the air filter module comprising:
   a top plate;
   a bottom plate;
   a first front corner connected to the top plate and the bottom plate,
   the first front corner including a first module perpendicular side wall, a first filter end retention wall, and a first angled wall, the first module perpendicular side wall adjacent to the first angled wall, and the first filter end retention wall parallel and adjacent to the front end of the air filter; and
   a back wall connected to the top plate and the bottom plate, the back wall including a first filter end angled wall, a second filter end angled wall, and a back filter edge retention side wall and a centrally positioned forward extending back filter positioning guide such that the air filter is positioned between the back filter edge retention side wall and a back filter positioning guide.

2. The apparatus of claim 1, further comprising:
   the top plate defining at least one top connection aperture.

3. The apparatus of claim 1, further comprising:
   the top plate defining a first top drop wall.

4. The apparatus of claim 1, further comprising:
   the bottom plate defining at least one bottom connection aperture.

5. The apparatus of claim 1, further comprising:
   the bottom plate defining a first bottom rise wall.

6. The apparatus of claim 1, further comprising:
   the first module perpendicular side wall defining at least one side connection aperture.

7. The apparatus of claim 1, further comprising:
   the back wall including a first side wall.

8. The apparatus of claim 1 the filter including a back end, further comprising:
   the back wall including a first back angled wall parallel and adjacent to the back end of the filter.

9. The apparatus of claim 1, further comprising:
   the back filter positioning guide further including a first guide face.

10. The apparatus of claim 1, further comprising:
    the back filter positioning guide further including a first positioning wall.

11. The apparatus of claim 1, further comprising:
    a second front corner connected to the top plate and the bottom plate,
    the second front corner including a second module perpendicular side wall, a second filter retention wall, and a second angled wall.

12. The apparatus of claim 1, further comprising:
    the second module perpendicular side wall also defining side connection apertures.

13. The apparatus of claim 11, further comprising:
    the back including a first back angled wall parallel and adjacent to the back end of the filter; and
    the back wall including a positioning guide connected to the first back angled wall.

14. The apparatus of claim 13, further comprising:
    the positioning guide further including a second guide face.

15. The apparatus of claim 13, further comprising:
    the positioning guide further including a second positioning wall.

16. An air filter module for holding an air filter, the air filter module comprising:
    a top plate;
    a bottom plate;
    a first front corner connected to the top plate and the bottom plate, the first front corner including a front mounting clip;
    a back wall connected to the top plate and the bottom plate,
    the back wall including a first side wall, a first back angled wall, and a centrally positioned forward extending back filter positioning guide,
    the back filter positioning guide including a positioning spring removably connected to the back wall, such that the air filter is trapped between the first side wall and the positioning spring.

* * * * *